US010104010B2

(12) United States Patent
Gan et al.

(10) Patent No.: US 10,104,010 B2
(45) Date of Patent: Oct. 16, 2018

(54) METHOD AND APPARATUS FOR ALLOCATING RESOURCES

(71) Applicant: HUAWEI TECHNOLOGIES CO., LTD., Shenzhen, Guangdong (CN)

(72) Inventors: Jiadong Gan, Shenzhen (CN); Andrew Cheese, Shenzhen (CN); Lars Holm, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 15/712,386

(22) Filed: Sep. 22, 2017

(65) Prior Publication Data

US 2018/0026909 A1    Jan. 25, 2018

Related U.S. Application Data

(63) Continuation of application No. 14/585,927, filed on Dec. 30, 2014, now Pat. No. 9,807,028, which is a
(Continued)

(30) Foreign Application Priority Data

Aug. 14, 2012  (CN) .......................... 2012 1 0288410

(51) Int. Cl.
*H04L 29/06* (2006.01)
*H04L 29/08* (2006.01)
(Continued)

(52) U.S. Cl.
CPC ................ *H04L 47/70* (2013.01); *G06F 9/50* (2013.01); *H04L 41/50* (2013.01); *H04L 47/782* (2013.01); *H04L 47/805* (2013.01)

(58) Field of Classification Search
CPC ...... H04L 47/805; H04L 47/782; H04L 47/70
(Continued)

(56) References Cited

U.S. PATENT DOCUMENTS 6,744,767 B1    6/2004  Chiu et al.
7,711,789 B1    5/2010  Jnagal et al.
(Continued)

FOREIGN PATENT DOCUMENTS

CN    101540771 A    9/2009
CN    102143063 A    8/2011
(Continued)

OTHER PUBLICATIONS

"Disaster Recovery Using Virtual Machines"—Dr. Timur Mirzoev, Dept. of Information Technology, Georgia Southern Univ., Jul. 2009 https://arxiv.org/ftp/arxiv/papers/1404/1404.2340.pdf.*
(Continued)

*Primary Examiner* — Randy A Scott
(74) *Attorney, Agent, or Firm* — Gregg Jansen (57) ABSTRACT

A method for allocating resources performed by an infrastructure management node is provided, the method comprising obtaining deployment requirements of virtual resources of a service application at an application layer, wherein the deployment requirements include requirements of isolation physical resources and requirements of affinity physical resources, wherein physical resources of levels are ranked by isolation from low to high and wherein the physical resources of the levels are ranked by affinity from low to high, wherein a level of the isolation physical resources is higher than a level of the affinity physical resources in the deployment requirements of the virtual resources, determining the physical resources which satisfy the requirements of isolation physical resources and requirements of affinity physical resources at a physical resources layer, and creating the virtual resources on the determined physical resources and providing the virtual resources to the service application.

16 Claims, 4 Drawing Sheets

Related U.S. Application Data continuation of application No. PCT/CN2013/079502, filed on Jul. 17, 2013.

(51) Int. Cl.
*H04L 12/911* (2013.01)
*H04L 12/24* (2006.01)
*G06F 9/50* (2006.01)
*H04L 12/927* (2013.01)

(58) Field of Classification Search
USPC .... 709/223, 224, 226, 227, 228; 718/1, 102, 718/104, 105
See application file for complete search history.

(56) References Cited

U.S. PATENT DOCUMENTS

| | | | |
|---|---|---|---|
| 8,639,793 B2 * | 1/2014 | Kapur | G06F 9/5072 709/220 |
| 2006/0085668 A1 | 4/2006 | Garrett | |
| 2008/0307271 A1 | 12/2008 | Nakajima et al. | |
| 2009/0238078 A1 | 9/2009 | Robinson et al. | |
| 2009/0265707 A1 | 10/2009 | Goodman et al. | |
| 2010/0128614 A1 | 5/2010 | Kuusela et al. | |
| 2011/0243146 A1 | 10/2011 | Armstrong et al. | |
| 2013/0159637 A1 * | 6/2013 | Forgette | G06F 3/0605 711/154 |
| 2015/0113149 A1 | 4/2015 | Gan et al. | |

FOREIGN PATENT DOCUMENTS

| | | |
|---|---|---|
| CN | 102419718 A | 4/2012 |
| CN | 102420850 A | 4/2012 |
| CN | 102857370 A | 1/2013 |

OTHER PUBLICATIONS

Simon Crosby et al., Document No. DSP0243 V1.1.0, "Open Virtualization Format Specification," DMTF Standard, Distributed Management Task Force, Inc., Jan. 12, 2010, total 42 pages.

Marcelo Ferreira Moreno et al., "Adaptable Resource Management Based on the Virtual Resource Tree Model", IEEE Computer Society, Proceedings of the International Conference on Networking, International Conference on Systems and International Conference on Mobile Communications and Learning Technologies (ICNICONSMCL'06), May 8, 2006, total 8 pages.

* cited by examiner

METHOD AND APPARATUS FOR ALLOCATING RESOURCES

CROSS-REFERENCE TO RELATED APPLICATIONS

This application is a continuation of U.S. patent application Ser. No. 14/585,927, filed on Dec. 30, 2014, which is a continuation of International Application No. PCT/CN2013/079502, filed on Jul. 17, 2013, which claims priority to Chinese Patent Application No. 201210288410.1, filed on Aug. 14, 2012, All of the afore-mentioned patent applications are hereby incorporated by reference in their entireties.

TECHNICAL FIELD

The present invention relates to the IT field, and more particularly to a method and an apparatus for allocating resources.

BACKGROUND

With continuous popularization of cloud concept, a layered architecture of an application program and an infrastructure management is widely applied to a solution requiring dynamic resource allocation. The architecture can be divided into three layers, which respectively are an application layer on the top layer, an infrastructure management layer in the middle and a physical resource layer on the bottom layer. Particularly, the application program on the top layer applies virtual resources to the infrastructure management layer, so as to guarantee the running of the application program, which needs one or more virtual resources. The infrastructure management layer selects suitable physical resources, and establishes virtual resources on the selected physical resources, for providing to the application program. Because it is required to support dynamic resource allocation, the application program is not aware of being deployed to which specific physical devices. However, whether different virtual resources are deployed on the same physical resource, it has great effects on quality attributes, such as the reliability and performance of born service. For example, two virtual resources deployed to the same physical resource can achieve the most efficient communication, and the application program has higher running efficiency; two virtual resources deployed to different physical resources can achieve the best failure isolation, and the application program has higher reliability, that is, two virtual resources will not break down at the same time due to failure of one host.

Running of the application program can be measured with two dimensions, i.e., isolation and affinity. Generally speaking, the higher the isolation between the two virtual resources is, the lower the affinity is, and it means that its supporting application program has higher reliability. Conversely, the higher the affinity is, the lower the isolation is, and it means that cooperation between virtual resources becomes closer, and its supporting application program can achieve higher service performance.

In the prior art, the infrastructure management layer can provide separate deployment or non-separate deployment to the application program on the top layer, regarding a application program which requires both the isolation and the affinity to be considered, for example, a telecom system with an advanced telecom computing architecture (Advanced Telecom Computing Architecture, ATCA) standard hardware architecture, the deployment requirement is that not only a certain isolation should be guaranteed, but also a certain affinity should be taken into account, however, the infrastructure management layer fails to provide a deployment policy which takes into account both the isolation and the affinity, and cannot satisfy the deployment requirement of the application program.

SUMMARY

A method for allocating resources performed by an infrastructure management node is provided, the method comprising obtaining deployment requirements of virtual resources of a service application at an application layer, wherein the deployment requirements include requirements of isolation physical resources and requirements of affinity physical resources, wherein physical resources of levels are ranked by isolation from low to high, comprising: a host, a chassis, a rack, a site, and a geographic disaster recovery, and wherein the physical resources of the levels are ranked by affinity from low to high, comprising: the geographic disaster recovery, the site, the rack, the chassis, and the host, wherein a level of the isolation physical resources is higher than a level of the affinity physical resources in the deployment requirements of the virtual resources, determining the physical resources which satisfy the requirements of isolation physical resources and requirements of affinity physical resources at a physical resources layer, and creating the virtual resources on the determined physical resources and providing the virtual resources to the service application.

An infrastructure management node for allocating resources is provided, the node comprising a non-transitory computer-readable storage medium storing instructions and a processor in communication with the storage medium. The processor executes the instructions to obtain deployment requirements of virtual resources of a service application at an application layer, wherein the deployment requirements include requirements of isolation physical resources and requirements of affinity physical resources, wherein physical resources of levels are ranked by isolation from low to high, comprising: a host, a chassis, a rack, a site, and a geographic disaster recovery, and wherein the physical resources of the levels are ranked by affinity from low to high, comprising: the geographic disaster recovery, the site, the rack, the chassis, and the host, wherein a level of the isolation physical resources is higher than a level of the affinity physical resources in the deployment requirements of the virtual resources, determine the physical resources which satisfy the requirements of the isolation physical resources and the requirements of the affinity physical resources at a physical resources layer, and create the virtual resources on the determined physical resources and providing the virtual resources to the service application.

DESCRIPTION OF EMBODIMENTS

The application environment according to embodiments disclosed herein can be divided into three layers, which respectively are an application layer on the top layer, an infrastructure management layer in the middle and a physical resource layer on the bottom layer. The application program refers to a program running on the application layer, including one or more processes during running, and may be distributed on one or more virtual machines (Virtual Machine, VM). The infrastructure management layer is to virtualize the physical resources, and provide virtual resources, such as VM, VM cluster, virtual volume and virtual network to the upper layer. Particularly, the VM cluster is a group of VMs, and each application program corresponds to one VM cluster. The VM is uniformly scheduled and managed by the infrastructure management layer and attached to a physical host. One physical host can establish one or more VMs, and the VM can fixed to a physical host or migrated to another physical host. The physical resource layer provides operations to the physical host, such as installation, deployment, upgrading, power up and down and etc., and the physical resource layer is in an ATCA hardware architecture and includes a host, a chassis and a rack.

The method disclosed in embodiments herein can be applied to a central processing unit, or implemented by the central processing unit. The central processing unit can be an integrated circuit chip with capability of processing signals. During the implementation, various steps of the above method can be accomplished by integrated logic circuits of hardware or instructions in a software manner in the central processing unit. In order to perform the method disclosed in embodiments herein, the central processing unit can be a general purpose processor, a digital signal processor (DSP), an application specific integrated circuit (ASIC), a field programmable gate array (FPGA) or other programmable logic devices, a discrete gate or transistor logic device, and a discrete hardware component, which can implement or perform various methods, steps and logic block diagrams disclosed in embodiments herein. The general purpose processor can be a microprocessor or the processor can be any conventional processor. The steps of the method disclosed in conjunction with embodiments can be directly executed and completed by a hardware processor, or by hardware and software modules in the hardware processor jointly. The software modules may be configured in a random access memory, an internal memory, a read only memory, a programmable read only memory or an electrically erasable and programmable read only memory, a register, or any other mature storage medium known in the art. The storage medium is configured in the storage, and the central processing unit reads information in the storage and accomplishes the foregoing method steps in conjunction with its hardware.

Embodiment 1

Figure 1:
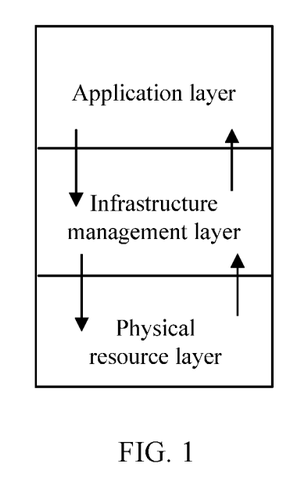
FIG. 1 is an architecture diagram of an application environment according to an embodiment.

As shown in FIG. 1, the flow of the method for allocating resources according to embodiments is as follows:

S101, an infrastructure management node provides options for describing resource allocation to a service application, where the options correspond to physical resources of at least two different levels;

In the embodiments, the physical resources include, but are not limited to, a physical host, a chassis, a rack, a site and a geographic disaster recovery. Particularly, the physical host includes a central processing unit (CPU), a memory and a hard disk, and the site includes a local area network and across-local area networks. The virtual resources in the embodiments include, but are not limited to, a virtual machine.

The infrastructure management node provides the service application with the options for describing resource allocation, the infrastructure management node can be a server, and the service application is the application program on the application layer.

Figure 3:
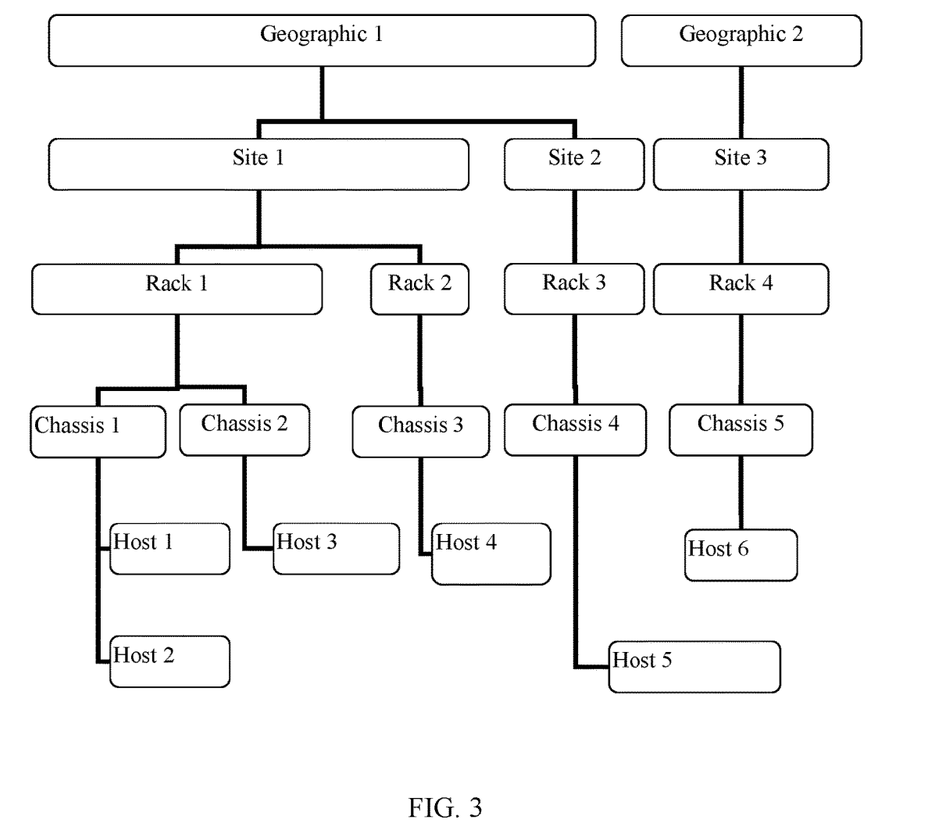
FIG. 3 is a diagram showing relative positional relationship of physical resources according to the first embodiment.

The relative positional relationship between physical resources may be summarized in FIG. 3. It should be noted that, the partitioning of physical resources in the embodiments herein is not limited to that in FIG. 3, subdividing the host into a CPU and a memory, or subdividing the site into a local area network and across-local area networks, or canceling the level of the site, all fall in the protection scope of the embodiments. FIG. 3 is a diagram showing relative positional relationship between physical resources in a tree structure. Root nodes for two trees in FIG. 3 are respectively "Geographic 1" and "Geographic 2", and descendant nodes for the root nodes are "Site", "Rack", "Chassis" and "Host". Particularly, the "Site" is a precursor node of the "Rack", the "Rack" is a precursor node of the "Chassis", and the "Chassis" is a precursor node of the "Host". The "host-chassis-rack" in an ATCA standard corresponds to "Host-Chassis-Rack" in FIG. 3. The "Site" is a site including a large number of physical devices, for example, data center devices arranged in a same building. The "Geographic" is a geographic disaster recovery, that is, a geographic distance between two areas shall satisfy a requirement on natural disaster recovery. A host, a chassis, a rack, a site and a geographic disaster recovery are ranked from low to high levels, the chassis may include multiple hosts, the rack may include multiple chassis, the site may include multiple racks, and the geographic disaster recovery may include multiple sites. The above five different levels with different physical senses can explicitly correspond to a certain physical isolation and affinity. For example, if a same host runs different VMs respectively, then the affinity is the highest, the isolation is the lowest, once the host breaks down, none of the VMs in the host can run; different hosts in a same chassis run different VMs, hosts connect and communicate with each other via chassis, share other components in the chassis, such as power supply, fan, management module and etc, then the affinity between VMs is lower than the case when the same host runs different VMs, the isolation is higher than the case when the same host runs different VMs, once one of the hosts breaks down, VMs on the other hosts work normally, however, once the power supply, the fan and the like break down, then all the hosts in the whole chassis will break down. If different VMs are in different chassis but all in the same rack, then the affinity of VMs is not as high as the case when VMs are in the same chassis, but isolation is higher than the case when VMs are in the same chassis, once power supply or fan in one chassis goes wrong, the rest of chassis on the rack can work normally. By such analogy, VMs in "same site, different rack" have lower affinity and higher isolation than VMs in "same rack, different chassis".

Prior to providing options for describing resource allocation to a service application, the infrastructure management node also can transmit physical resource configuration request information to one or more physical hosts within a management range of the node, if there is only one physical host within the management range of the infrastructure management node, then it merely needs to transmit the request information to the physical host, if there are multiple physical hosts within the management range, then the infrastructure management node transmits mass request information to all the physical hosts within the node hierarchy periodically or in real time, configuration of different physical hosts may be changed, such as power up and down at different time periods, replacing chassis, rack and the like, then the infrastructure management node, by transmitting periodically or in real time, acquires resource configuration information and updates resource configuration stored therein. After receiving the resource configuration request, the physical host transmits its resource configuration information during networking to the management node. The infrastructure management node receives the physical resource configuration information transmitted by one or more physical hosts, and the physical resource configuration information includes corresponding relationship of different levels. For example, host A belongs to chassis A, chassis A belongs to rack A, rack A belongs to site A, site A belongs to geographic disaster recovery area A, then the information reported by host A is "host A-chassis A-rack A-site A-geographic disaster recovery A", while host B belongs to chassis B, chassis B belongs to rack A, then the information reported by host B is "host B-chassis B-rack A-site A-geographic disaster recovery A".

After receiving the physical resource configuration information reported by the physical host, the infrastructure management node stores the physical resource configuration information of different levels according to a tree hierarchy structure. In a data structure, the tree structure includes root nodes, parent nodes, brother nodes, child nodes, descendant nodes and etc, with the highest level being defined as the root node, and the other levels are stored according to a tree structure from high to low. In the above example, the root node is "geographic disaster recovery A", its child node is "site A", a child node of the site A is "rack A", then "rack A" is the descendent node of "geographic disaster recovery A", and "geographic disaster recovery A" is the ancestor node of "rack A". According to information reported by hosts A and B, the physical resource configuration information stored by the infrastructure management node can be in a manner of "(geographic disaster recovery A(rack A(chassis A(host A, host B))))", where the comma indicates that host A and host B are in the same level, those outside the brackets have a higher physical resource level than those in the brackets, for example, chassis A is one level higher than host A and host B, and rack A is one level higher than chassis A.

S102, determine, according to a selection result of the options fed back by the service application, physical resources of a level corresponding to the selection result;

The service application determines one or more options satisfying the isolation and affinity according to a requirement on the isolation and the affinity capable of guaranteeing its quality of the service, QOS, and feeds the selection result of the options back to the node. For example, in order to guarantee QoS of service application, the service application needs to run on "active-standby" two VMs, which interact frequently, and requires a communication bandwidth between the two VMs is no lower than 100M, then relatively high performance and reliability of the service application are required, that is, relatively high affinity and isolation are required, it should be guaranteed that two VMs are created on a same chassis but different physical hosts under the same chassis, it should be guaranteed that once one physical host breaks down, the other physical host can work normally, and the two physical hosts communicate with each other via a bus within the chassis, which is high in efficiency and quick in speed. Therefore, the service application feeds a selection result of "same chassis, different host" back to the management node.

The infrastructure management node determines, according to the selection result fed back, a node at a level corresponding to the selection result in the tree hierarchy structure, and the node is the stored physical resource information of the level corresponding to the selection result.

If the selection result designates isolation and affinity of different levels, and the level corresponding to the affinity is higher than the level corresponding to the isolation, then the management node determines a node of the level corresponding to the affinity in the tree hierarchy structure, and determines a plurality of child nodes or descendant nodes of the level corresponding to the isolation in the hierarchy structure of the node, the plurality of child nodes or descendant nodes is physical resource information of the level corresponding to the selection result. For example, as shown in FIG. 3, the service application feeds back a selection result of "same chassis, different host", then the management node firstly determines the "chassis" level in the stored tree hierarchy structure, only the host level is under the chassis level, the management node traverses all the child nodes of the "chassis", only chassis 1, namely chassis 1 in FIG. 3 has two different physical hosts, the rest of chassis only have one host, then the management node determines two physical hosts, host 1 and host 2, under chassis 1 are physical resources satisfying the isolation and affinity designated by the selection result. The management node will create two VMs respectively on host 1 and host 2, for providing to the service application.

If the service application selects "same rack, different host", through the above processing steps of the management node, the management node traverses child nodes and descendant nodes of the "rack", only rack 1, namely rack 1 in FIG. 3 has three different physical hosts, the rest of chassis only have one host, then the management node determines three physical hosts, host 1, host 2 and host 3, under rack 1 are physical resources satisfying the isolation and affinity designated by the selection result, the management node can create two VMs respectively on host 1 and host 2, or host 1 and host 3, or host 2 and host 3, for providing to the service application, whether to select host 1 and host 2, or host 1 and host 3, or host 2 and host 3 can be preset or determined according to factors such as load balance.

If the service application selects "same rack, different site", the management node judges that the service application improperly selects the level, does not perform any processing or feeds an error notification back to the service application.

If the selection result only designates a level corresponding to the affinity or a level corresponding to the isolation, then the management node determines one node of the level corresponding to the affinity in the tree hierarchy structure, or more nodes of the level corresponding to the isolation in the tree hierarchy structure. For example, if the service application only designates "same chassis", then the management node only needs to select one chassis, such as chassis 1 in FIG. 3, different VMs can be created on any of the physical hosts under chassis 1 in FIG. 3. If the service application only designates "different hosts", then the management node only needs to create different VMs on different hosts, such as any multiple hosts from host 1 to host 6 in FIG. 3.

S103, establish virtual resources on the physical resources of the level corresponding to the selection result, and provide the virtual resources to the service application.

Through the method for allocating resources provided in embodiments herein, the infrastructure management node transmits options for describing resource allocation to a service application; establishes virtual resources on the physical resources corresponding to the selection result according to a selection result of the options fed back by the service application, and provides the virtual resources to the service application, thereby satisfying a deployment requirement of the service application, and guaranteeing QoS of the service application.

Embodiment 2

Figure 4:
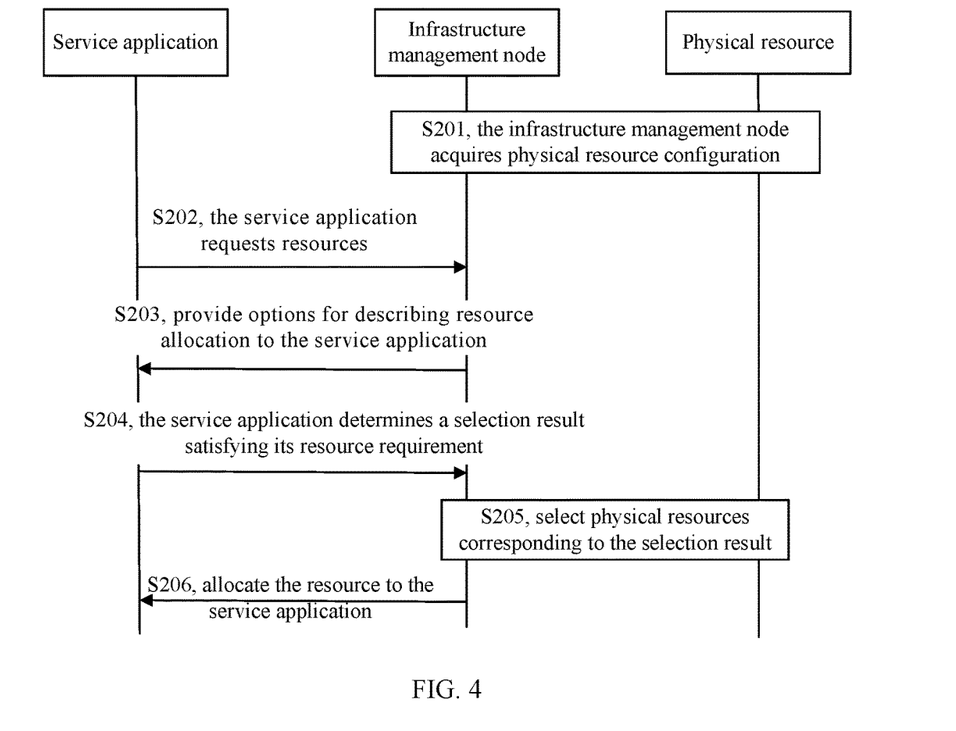
FIG. 4 is a flow chart of a second embodiment.

FIG. 4 is a flow chart of embodiments, as shown in FIG. 4, the flow of the embodiments is as follows:

S201, the infrastructure management node acquires physical resource configuration;

In this embodiment, the infrastructure management node is a server responsible for scheduling physical resources and providing virtual resources to an application layer. The physical resources follow the advanced telecom computing architecture (Advanced Telecom Computing Architecture, ATCA) standard, and include a host, a chassis, a rack and the like, and the host includes a CPU, a memory, a magnetic disk memory, a network interface and etc. The virtual resources include a VM, a VM cluster, a virtual volume, a virtual network and etc., and this embodiment is described by taking the VM as an example.

The relative positional relationship between physical resources is shown in FIG. 3, and the "host-chassis-rack" in the ATCA standard corresponds to "Host-Chassis-Rack" in FIG. 3. The "Site" is a site including a large number of physical devices, for example, data center devices arranged in a same building. The "Geographic" is a geographic disaster recovery, that is, a geographic distance between two areas shall satisfy a requirement on natural disaster recovery. A host, a chassis, a rack, a site and a geographic disaster recovery are ranked from low to high levels, the chassis may include multiple hosts, the rack may include multiple chassis, the site may include multiple racks, and the geographic disaster recovery may include multiple sites. The above five different levels with different physical senses can explicitly correspond to a certain physical isolation and affinity. For example, if a same host runs different VMs respectively, then the affinity is the highest, the isolation is the lowest, once the host breaks down, none of the VMs in the host can run; different hosts in a same chassis run different VMs, hosts connect and communicate with each other via chassis, share other components in the chassis, such as power supply, fan, management module and etc, then the affinity between VMs is lower than the case when the same host runs different VMs, the isolation is higher than the case when the same host runs different VMs, once one of the hosts breaks down, VMs on the other hosts work normally, however, once the power supply, the fan and etc. break down, then all the hosts in the whole chassis will break down. If different VMs are in different chassis but all in a same rack, then the affinity of VMs is not as high as the case when VMs are in the same chassis, but isolation is higher than the case when VMs are in the same chassis, once power supply or fan in one chassis goes wrong, the rest of chassis on the rack can work normally. By such analogy, VMs in "same site, different rack" have lower affinity and higher isolation than VMs in "same rack, different chassis".

It should be noted that, in addition to being able to divide the physical resources into "a host, a chassis, a rack, a site and a geographic disaster recovery", the "host" can be subdivided into a central processing unit (CPU), a memory and a hard disk. A single host can include several CPUs, a memory and a hard disk of a certain specification. Meanwhile, "site" can be subdivided into two levels of a same local area network and across-local area networks.

Figure 2:
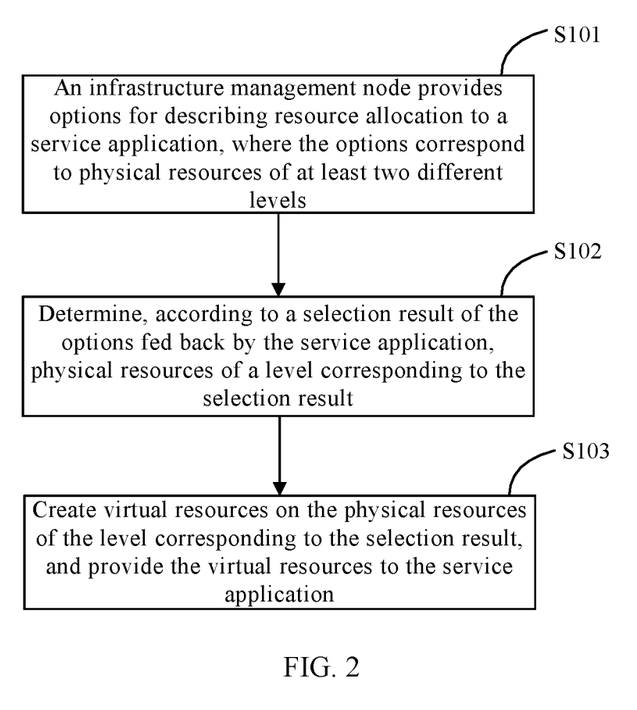
FIG. 2 is a flow chart of a first embodiment.

The infrastructure management node acquiring physical resource configuration is shown in FIG. 2, the specific position of physical resources has been determined when establishing the physical resource architecture, so the physical resource configuration can be entered manually, or acquired by the infrastructure management node periodically or in real time, and it can be acquired by transmitting mass physical resource configuration request information to each host within the management hierarchy of the node, and each host reports its resource configuration to the infrastructure management node. For example, host A belongs to chassis A, chassis A belongs to rack A, rack A belongs to site A, site A belongs to geographic disaster recovery A, then the information reported by host A is "host A-chassis A-rack A-site A-geographic disaster recovery A", while host B belongs to chassis B, chassis B belongs to rack A, then the information reported by host B is "host B-chassis B-rack A-site A-geographic disaster recovery A".

After receiving the physical resource configuration information reported by the physical host, the infrastructure management node stores the physical resource configuration information of different levels according to a tree hierarchy structure. In a data structure, the tree structure includes root nodes, parent nodes, brother nodes, child nodes, descendant nodes and etc, with the highest level being defined as the root node, and the other levels are stored according to a tree structure from high to low. In the above example, the root node is "geographic disaster recovery A", its child node is "site A", child node of the site A is "rack A", then "rack A" is the descendant node of "geographic disaster recovery A", and "geographic disaster recovery A" is the ancestor node of "rack A". According to information reported by hosts A and B, the physical resource configuration information stored by the infrastructure management node can be in a manner of "(geographic disaster recovery A(rack A(chassis A(host A, host B))))", where the comma indicates that host A and host B are in the same level, those outside the brackets have one physical resource level higher than those in the brackets.

S202, a service application requests resources;

The service application is an application program, which needs corresponding virtual machine VM for providing resources thereto during running. When the service application is initialized, the service application requests resources to the infrastructure management node, the infrastructure management node is responsible for providing corresponding physical resources, creating VMs on the provided physical resources, and providing the created VMs to the service application.

S203, provide options for describing resource allocation to a service application;

The infrastructure management node provides options for describing resource allocation to the service application, particularly, extending an interface providing options and providing the options to the service application via the interface. The option form can be at least one of "host_affinity", "host_isolation", "chassis_affinity", "chassis_isolation", "rack_affinity", "rack_isolation", "site_affinity", "site_isolation", "geographic_affinity", "geographic_isolation", and "non-designated", embodiments only disclose one form thereof, and other option form, such as "host-affinity", although is different in form, but has the same meaning, that is, different options indicates to provide different levels of host, chassis and rack, which also falls within the protection scope of the embodiments.

"Non-designated" indicates that no specific creation requirement is designated for VMs, "host_affinity" indicates that different VMs are created on the same host, "host_isolation" indicates that different VMs are created on different hosts, "chassis_affinity" indicates that different VMs are on the same chassis, and "chassis_isolation" indicates that different VMs are on different chassis. By such analogy, other options indicate that VMs are or are not within the level provided by the options. A host, a chassis, a rack, a site and a geographic disaster recovery are ranked by affinity from high to low, while a geographic disaster recovery, a site, a rack, a chassis and a host are ranked by isolation from high to low.

If the "host" is subdivided into a CPU, a memory and a hard disk, then the option can be added with "CPU_affinity", "CPU_isolation", "memory_affinity", "memory_isolation", "harddisk_affinity" and "harddisk_isolation", and the above subdivided options are used to replace "host_affinity" and "host_isolation" in the original options. "CPU_affinity" indicates that VMs use the same virtual CPU, where the virtual CPU is achieved by virtualization technique of CPU, which allows a single CPU emulate multiple CPUs in parallel, and allows one platform simultaneously runs multiple operating systems; "CPU_isolation" indicates that VMs separately use different virtual CPUs. If the site is subdivided into a local area network and across-local area networks, then it can be added with "local area network_affinity", "local area network_isolation", "across-local area networks_affinity", "across-local area networks_isolation", which can be used to replace "site_affinity" and "site_isolation" in the original options.

S204, the service application determines a selection result satisfying a resource requirement thereof;

The service application, according to the options provided by the infrastructure management node, determines a selection result satisfying its running resource requirement, and feeds the selection result back to the infrastructure management node. Particularly, the service application receives and stores the options provided by the infrastructure management node, determines one or more options according to the QoS requirement thereof, and transmits the option or options back to the infrastructure management node. For example, in order to guarantee its QoS for running, the service application needs to run on "active-standby" two VMs, which interact frequently, and requires a communication bandwidth between the two VMs to be no lower than 100M, relatively high performance and reliability of the service application are required, that is, relatively high affinity and isolation are required, among the options provided by the infrastructure management node, the affinity of "host_affinity" and "chassis_affinity" both satisfy the wideband requirement, however, since the service application needs to run on "active-standby" two VMs, and the active and standby VMs cannot create on the same physical host, so only the options of "chassis_affinity" and "host_isolation" can satisfy the service application; if the service application has a higher requirement on the performance but a lower requirement on the reliability, then do not designate isolation, only select corresponding options for affinity, such as "host_affinity", no matter whether is the same chassis, rack or site; the service application, such as a webpage, has low requirements on reliability and performance, "non-designated" can be selected, not designating corresponding affinity and isolation, that is, whether or not different VMs are created on the same host, chassis, rack or site is possible.

S205, select physical resources satisfying the selection result;

After receiving the selection result selected by the service application, the infrastructure management node selects physical resources satisfying the selection result, and creates VMs on the selected physical resources.

For example, the service application selects options of "chassis_affinity" and "host_isolation", according to the relative positional relationship between physical resources shown in FIG. 3, only host 1 and host 2 satisfy the condition, and VMs are respectively created on host 1 and host 2. As for the selection result of only selecting "host_affinity" while not designating the isolation, host 1 to host 6 all satisfy the condition, that is, different VM can be created on any of host 1 to host 6.

The infrastructure management node determines, according to the selection result fed back, a node of the level corresponding to the selection result in the tree hierarchy structure, and the node is the stored physical resource information of the level corresponding to the selection result.

If the selection result designates isolation and affinity of different levels, and the level corresponding to the affinity is higher than the level corresponding to the isolation, the infrastructure management node determines a node of the level corresponding to the affinity in the tree hierarchy structure, and determines a plurality of child nodes or descendant nodes of the level corresponding to the isolation in the hierarchy structure of the node, the plurality of child nodes or descendant nodes are physical resource information of the level corresponding to the selection result. For example, as shown in FIG. 3, the service application feeds back a selection result of "same chassis, different host", i.e., the two options of "chassis_affinity" and "host_isolation", then the infrastructure management node firstly determines the "chassis" level in the stored tree hierarchy structure, only the host level is under the chassis level, the infrastructure management node traverses all the child nodes of the "chassis", only chassis 1, namely chassis 1 in FIG. 3 has two different physical hosts, the rest of chassis only have one host, then the infrastructure management node determines two physical hosts, host 1 and host 2, under chassis 1 are physical resources satisfying the isolation and affinity designated by the selection result. The infrastructure management node will create two VMs respectively on host 1 and host 2, for providing to the service application.

If the service application selects "same rack, different host", i.e., the two options of "rack_affinity" and "host_isolation", through the above processing steps of the infrastructure management node, the infrastructure management node traverses child nodes and descendant nodes of the "rack", only rack 1, namely rack 1 in FIG. 3 has three different physical hosts, the rest of chassis only have one host, then the infrastructure management node determines three physical hosts, host 1, host 2 and host 3, under rack 1 are physical resources satisfying the isolation and affinity designated by the selection result, the infrastructure management node can create two VMs respectively on host 1 and host 2, or host 1 and host 3, or host 2 and host 3, for providing to the service application, whether to select host 1 and host 2, or host 1 and host 3, or host 2 and host 3 can be preset or determined according to factors such as load balance.

If the service application selects "same rack, different site", the infrastructure management node judges that the service application improperly selects the level, does not perform any processing or feeds the error notification back to the service application.

If the selection result only designates a level corresponding to the affinity or a level corresponding to the isolation, then the infrastructure management node determines one node of the level corresponding to the affinity in the tree hierarchy structure, or more nodes of the level corresponding to the isolation in the tree hierarchy structure. For example, if the service application only designates "same chassis", then the infrastructure management node only needs to select one chassis, such as chassis 1 in FIG. 3, different VMs are created on any of the physical hosts under chassis 1 in FIG. 3. If the service application only designates "different hosts", then the infrastructure management node only needs to create different VMs on different hosts, such as any plurality of hosts from host 1 to host 6 in the figure.

S206, allocate the resource to the service application.

The management node allocates the created VMs to the service application to complete operations of resource allocation.

In the method for allocating resources provided in embodiments herein, the infrastructure management node transmits options for describing resource allocation to a service application; creates virtual resources on the physical resources corresponding to the selection result according to the selection result of the options fed back by the service application, and provides the virtual resources to the service application, thereby satisfying a deployment requirement of the service application, and guaranteeing QoS of the service application.

Embodiment 3

Figure 5:
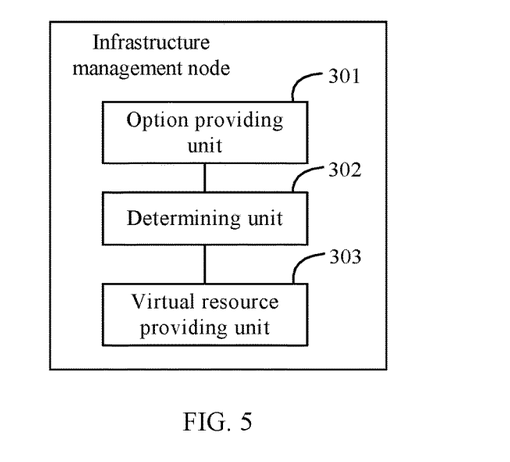
FIG. 5 is a structural diagram of a management node according to a third embodiment.

FIG. 5 is a structural diagram of a construction of an infrastructure management node, as shown in FIG. 5, the infrastructure management node includes:

an option providing unit 301, configured to provide options for describing resource allocation to a service application, where the options correspond to physical resources of at least two different levels;

In the embodiments, the physical resources include, but are not limited to, a physical host, a chassis, a rack, a site and a geographic disaster recovery. Particularly, the physical host includes a central processing unit (CPU), a memory and a hard disk, and the site includes a local area network and across-local area networks. The virtual resources include, but are not limited to, virtual machines in the embodiments.

The relative positional relationship between physical resources may be summarized in FIG. 3. It should be noted that, the partitioning of physical resources in the embodiments is not limited to that in FIG. 3, subdividing the host into a CPU and a memory, or subdividing the site into a local area network and across-local area networks, or canceling the level of the site, all fall in the protection scope of the embodiments. FIG. 3 is a diagram showing relative positional relationship between physical resources in a tree structure. Root nodes for two trees in FIG. 3 are respectively "Geographic 1" and "Geographic 2", and descendant nodes for the root nodes are "Site", "Rack", "Chassis" and "Host". Particularly, the "Site" is a precursor node of the "rack", the "rack" is a precursor node of the "chassis", and the "chassis" is a precursor node of the "host". The "host-chassis-rack" in an ATCA standard corresponds to "Host-Chassis-Rack" in FIG. X. The "Site" is a site including a large number of physical devices, for example, data center devices arranged in a same building. The "Geographic" is a geographic disaster recovery, that is, a geographic distance between two areas shall satisfy a requirement on natural disaster recovery. A host, a chassis, a rack, a site and a geographic disaster recovery are ranked from low to high levels, the chassis may include multiple hosts, the rack may include multiple chassis, the site may include multiple racks, and the geographic disaster recovery may include multiple sites. The above five levels with different physical senses can explicitly correspond to a certain physical isolation and affinity. For example, if a same host runs different VMs respectively, then the affinity is the highest, the isolation is the lowest, once the host breaks down, none of the VMs in the host can run; different hosts in a same chassis run different VMs, hosts connect and communicate with each other via chassis and share other components in the chassis, such as power supply, fan, management module and etc, then the affinity between VMs is lower than the case when the same host runs different VMs, the isolation is higher than the case when the same host runs different VMs, once one of the hosts breaks down, VMs on the other hosts work normally, however, once the power supply, the fan and the like break down, then all the hosts in the whole chassis will break down. If different VMs are in different chassis but all in a same rack, then the affinity of VMs is not as high as the case when VMs are in the same chassis, but isolation is higher than the case when VMs are in the same chassis, once power supply or fan in one chassis goes wrong, the rest of chassis on the rack can work normally. By such analogy, VMs in "same rack, different site" has lower affinity and higher isolation than VM in "same chassis, different rack".

Prior to providing options for describing resource allocation to the service application, the option providing unit 301 also needs to transmit physical resource configuration request information to one or more physical hosts within a management range of the node, if there is only one physical host within the management range of the node, then it merely needs to transmit the request information to the physical host, if there are multiple physical hosts within the management range, then the transmitting unit of the infrastructure management node transmits mass request information to all the physical hosts within the node hierarchy periodically or in real time, configuration of different physical hosts may be changed, such as power up and down at different time periods, replacing chassis, rack and the like, then the acquisition unit of the infrastructure management node, by transmitting periodically or in real time, acquires resource configuration information and updates resource configuration information stored therein. After receiving the resource configuration request, the physical host transmits its resource configuration information during networking to the receiving unit of the infrastructure management node. The receiving unit of the infrastructure management node receives the physical resource configuration information transmitted by one or more physical hosts, and the physical resource configuration information includes corresponding relationship of different levels. For example, host A belongs to chassis A, chassis A belongs to rack A, rack A belongs to site A, site A belongs to geographic disaster recovery A, then the information reported by host A is "host A-chassis A-rack A-site A-geographic disaster recovery A", while host B belongs to chassis B, chassis B belongs to rack A, then the information reported by host B is "host B-chassis B-rack A-site A-geographic disaster recovery A".

After receiving the physical resource configuration information reported by the physical host, the storing unit of the infrastructure management node stores the physical resource configuration information of different levels according to a tree hierarchy structure. In a data structure, the tree structure includes root nodes, parent nodes, brother nodes, child nodes, descendant nodes and the like, with the highest level being defined as the root node, and the remaining levels are stored according to a tree structure from high to low. In the above example, the root node is "geographic disaster recovery A", its child node is "site A", a child node of the site A is "rack A", then "rack A" is the descendant node of "geographic disaster recovery A", and "geographic disaster recovery A" is the ancestor node of "rack A". According to information reported by hosts A and B, the physical resource configuration information stored by the storing unit can be in a manner of "(geographic disaster recovery A(rack A(chassis A(host A, host B))))", where the comma indicates that host A and host B are in the same level, those outside the brackets have a higher physical resource level than those in the brackets, for example, chassis A is one level higher than host A and host B, and rack A is one level higher than chassis A.

A determining unit 302, configured to determine, according to a selection result of the options fed back by the service application, physical resources of a level corresponding to the selection result;

The service application determines one or more options satisfying the isolation and affinity according to a requirement on the isolation and the affinity capable of guaranteeing its quality of service, QOS, and feeds the selection result of the options back to the determining unit 302 of the node. For example, in order to guarantee QoS of service application, the service application needs to run on "active-standby" two VMs, which interact frequently, and requires a communication bandwidth of the two VMs is no lower than 100M, then relatively high performance and reliability of the service application are required, that is, relatively high affinity and isolation are required, it should be guaranteed that two VMs are created on a same chassis but different physical hosts under the same chassis, it should be guaranteed that once one physical host breaks down, other physical hosts can work normally, and the two physical hosts communicate with each other via buses within the chassis, which is high in efficiency and quick in speed. Therefore, the service application feeds a selection result of "same chassis, different host" back to the determining unit 302.

The determining unit 302 determines, according to the selection result fed back, a node of a level corresponding to the selection result in the tree hierarchy, and the node is the stored physical resource information of the level corresponding to the selection result.

If the selection result designates isolation and affinity of different levels, and the level corresponding to the affinity is higher than the level corresponding to the isolation, the determining unit 302 determines a node of the level corresponding to the affinity in the tree hierarchy, and determines a plurality of child nodes or descendant nodes of the level corresponding to the isolation in a hierarchy structure of the node, the plurality of child nodes or descendant nodes are physical resource information of the level corresponding to the selection result. For example, as shown in FIG. 3, the service application feeds back a selection result of "same chassis, different host", then the determining unit 302 firstly determines the "chassis" level in the stored tree hierarchy structure, only the host level is under the chassis level, the determining unit 302 traverses all the child nodes of the "chassis", only chassis 1, namely chassis 1 in FIG. 3 has two different physical hosts, the rest of chassis only have one host, then the determining unit 302 determines two physical hosts, host 1 and host 2, under chassis 1 are physical resources satisfying the isolation and affinity designated by the selection result. The infrastructure management node will create two VMs respectively on host 1 and host 2 with the providing unit, for providing to the service application.

If the service application selects "same rack, different host", through the above processing steps, the infrastructure management node traverses child nodes and descendant nodes of the "rack", only rack 1, namely rack 1 in FIG. 3 has three different physical hosts, the rest of chassis only have one host, then the determining unit 302 determines three physical hosts, host 1, host 2 and host 3, under rack 1 are physical resources satisfying the isolation and affinity designated by the selection result, the determining unit 302 can create two VMs respectively on host 1 and host 2, or host 1 and host 3, or host 2 and host 3, for the resource providing unit to provide to the service application, whether to select host 1 and host 2, or host 1 and host 3, or host 2 and host 3 can be preset or determined by factors such as load balance.

If the service application selects "same rack, different site", the infrastructure management node judges that the service application improperly selects the level with a judging unit, does not perform any processing or feeds the error notification back to the service application.

If the selection result only designates a level corresponding to the affinity or a level corresponding to the isolation, then the determining unit 302 determines one node of the level corresponding to the affinity in the tree hierarchy structure, or more nodes of the level corresponding to the isolation in the tree hierarchy structure. For example, if the service application only designates "same chassis", then the determining unit 302 only needs to select one chassis, such as chassis 1 in FIG. 3, different VMs are created on any of the physical hosts under chassis 1 in FIG. 3. If the service application only designates "different hosts", then the determining unit 302 only needs to create different VMs on different hosts, such as any number of hosts from host 1 to host 6 in the figure.

A virtual resource providing unit 303, configured to create virtual resources on the physical resources of the level corresponding to the selection result, and provide the virtual resources to the service application.

Figure 6:
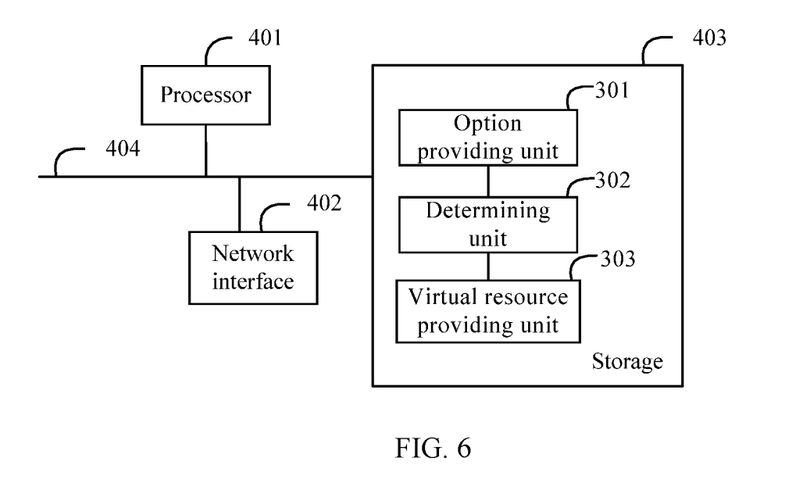
FIG. 6 is an architecture diagram of a management node hardware construction according to the third embodiment.

FIG. 6 is a hardware architecture diagram of an infrastructure management node according to another embodiment, including at least one processor 401 (such as CPU), at least one network interface 402 or other communication interface, a storage 403 and at least one communication bus 404, for achieving connection and communication between these devices. The processor 401 is configured to execute an executable module, such as a computer program, stored in the storage 403. The storage 403 may include a high-speed random access memory (RAM: Random Access Memory), or may further include a non-volatile memory (non-volatile memory), such as at least one magnetic disk storage. At least one network interface 402 (wired or wireless) can achieve communication connection between the system gateway and at least one other network element via the Internet, a wide area network, a local network, a metropolitan area network and the like.

In some embodiments, the storage 403 stores program instructions which can be executed by the processor 401, the program instructions include the option providing unit 301, the determining unit 302 and the virtual resource providing unit 303, see corresponding unit disclosed in FIG. 5 for specific implementation of each unit, and no details will be given herein.

In the infrastructure management node for allocating resources provided in embodiments herein, the option providing unit is configured to provide options for describing resource configuration to a service application, the determining unit according to a selection result fed back by the service application, the providing unit creates virtual resources on the physical resources corresponding to the selection result, and provides the virtual resources to the service application, thereby satisfying a deployment requirement of the service application, and guaranteeing QoS of the service application.

From the description of the embodiments above, persons skilled in the art can clearly know that the embodiments can be implemented by at least a processor, processing hardware, firmware or any combination thereof. When implemented in software, the functions above may be stored on a non-transitory computer-readable storage medium or transmitted over as one or more instructions or code on a non-transitory computer-readable storage medium. The non-transitory computer-readable storage medium includes both computer storage medium and communication medium including any medium that facilitates transfer of a computer program from one place to another. The storage medium may be any available medium that can be accessed by a computer. By way of example, and not limitation, such non-transitory computer-readable storage medium can include RAM, ROM, EEPROM, CD-ROM or other optical disk storage, magnetic disk storage medium or other magnetic storage devices, or any other medium that can be used to carry or store desired program code in the form of instructions or data structures and that can be accessed by a computer. Moreover, any connection can properly become a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. The disk (Disk) and disc (disc), as used in the embodiments, include compact disc (CD), laser disc, optical disc, digital versatile disc (DVD), floppy disk and Blu-ray disc where disks usually reproduce data magnetically, while discs usually reproduce data optically with lasers. Combinations of the above should also be included within the protection scope of non-transitory computer-readable storage medium.

The above description is merely preferred embodiments of the technical solutions presented herein, but is not intended to limit the protection. Any modification, equivalent replacement, and improvement made without departing from the spirit and principle shall fall within the protection level of the present embodiments.

What is claimed is:

1. A method for allocating resources performed by an infrastructure management node, comprising:
   obtaining deployment requirements of virtual resources of a service application at an application layer, wherein the deployment requirements include requirements of isolation physical resources and requirements of affinity physical resources, wherein physical resources of levels are ranked by isolation from low to high, comprising: a host, a chassis, a rack, a site, and a geographic disaster recovery, and wherein the physical resources of the levels are ranked by affinity from low to high, comprising: the geographic disaster recovery, the site, the rack, the chassis, and the host, wherein a level of the isolation physical resources is higher than a level of the affinity physical resources in the deployment requirements of the virtual resources;
   determining the physical resources which satisfy the requirements of isolation physical resources and requirements of affinity physical resources at a physical resources layer; and
   creating the virtual resources on the determined physical resources and providing the virtual resources to the service application.

2. The method according to claim 1, prior to obtaining deployment requirements of the virtual resources of a service application, the method further comprising:
   transmitting physical resource configuration request information to a host within a management range of the infrastructure management node;
   receiving physical resource configuration information transmitted by the host, wherein the physical resource configuration information comprises corresponding relationships of the physical resources of different levels; and
   storing the physical resource configuration information according to a tree hierarchy structure.

3. The method according to claim 1, wherein the determining of physical resources comprises:
   determining a node of the level which satisfies the requirements of the isolation physical resources and the requirements of the affinity physical resources in a tree hierarchy structure, wherein the tree hierarchy structure stores physical resource configuration information of the physical resources layer.

4. The method according to claim 1, wherein the determining of physical resources comprises:
   determining a node of the level corresponding to the requirements of affinity physical resources in a tree hierarchy structure, wherein the tree hierarchy structure stores physical resource configuration information of the physical resources layer; and
   determining a plurality of child nodes or descendant nodes of the level corresponding to the requirements of isolation physical resources in a hierarchy structure of the node.

5. The method according to claim 1, wherein if the level of the isolation physical resources is lower than the level of the affinity physical resources in the deployment requirements of the virtual resources, the method further comprises:
   determining the deployment requirements of the virtual resources is in error.

6. The method according to claim 1, wherein the deployment requirements of the virtual resources are determined by the service application according to a requirement of guaranteeing isolation and affinity of a quality of service (QoS) of the service application.

7. The method according to claim 1, wherein the host comprises a central processing unit (CPU), a memory, and a hard disk.

8. The method according to claim 1, wherein the site comprises a local area network and across-local area networks.

9. An infrastructure management node for allocating resources, comprising:
   a non-transitory computer-readable storage medium storing instructions; and
   a processor in communication with the storage medium, with the processor executing the instructions to:
   obtain deployment requirements of virtual resources of a service application at an application layer, wherein the deployment requirements include requirements of isolation physical resources and requirements of affinity physical resources, wherein physical resources of levels are ranked by isolation from low to high, comprising: a host, a chassis, a rack, a site, and a geographic disaster recovery, and wherein the physical resources of the levels are ranked by affinity from low to high, comprising:

the geographic disaster recovery, the site, the rack, the chassis, and the host, wherein a level of the isolation physical resources is higher than a level of the affinity physical resources in the deployment requirements of the virtual resources;

determine the physical resources which satisfy the requirements of the isolation physical resources and the requirements of the affinity physical resources at a physical resources layer; and create the virtual resources on the determined physical resources and providing the virtual resources to the service application.

10. The node according to claim 9, wherein the processor further executes the instructions to:

transmit physical resource configuration request information to a host within a management range of the infrastructure management node;

receive physical resource configuration information transmitted by the host, wherein the physical resource configuration information comprises corresponding relationships of the physical resources of different levels; and store the physical resource configuration information according to a tree hierarchy structure.

11. The node according to claim 9, wherein the determining of the physical resources comprises:

determining a node of the level which satisfies the requirements of the isolation physical resources and the requirements of the affinity physical resources in a tree hierarchy structure, wherein the tree hierarchy structure stores physical resource configuration information of the physical resources layer.

12. The node according to claim 9, wherein the determining of the physical resources comprises:

determining a node of the level corresponding to the requirements of the affinity physical resources in a tree hierarchy structure, wherein the tree hierarchy structure stores physical resource configuration information of the physical resources layer; and determining a plurality of child nodes or descendant nodes of the level corresponding to the requirements of the isolation physical resources in a hierarchy structure of the node.

13. The node according to claim 9, wherein if the level of the isolation physical resources is lower than the level of the affinity physical resources in the deployment requirements of the virtual resources, the processor further executes the instructions to:

determine the deployment requirements of the virtual resources is in error.

14. The node according to claim 9, wherein the deployment requirements of the virtual resources are determined by the service application according to a requirement of guaranteeing isolation and affinity of a quality of service (QoS) of the service application.

15. The node according to claim 9, wherein the host comprises a central processing unit (CPU), a memory, and a hard disk.

16. The node according to claim 9, wherein the site comprises a local area network and across-local area networks.

* * * * *